(No Model.)

A. W. GAYHART.
SHADE ROLLER.

No. 431,886. Patented July 8, 1890.

Witnesses
F. C. Gibson
C. D. Davis

Inventor
A. W. Gayhart
By his Attorney
C. M. Alexander

UNITED STATES PATENT OFFICE.

AARON W. GAYHART, OF WASHINGTON, PENNSYLVANIA.

SHADE-ROLLER.

SPECIFICATION forming part of Letters Patent No. 431,886, dated July 8, 1890.

Application filed March 27, 1890. Serial No. 345,522. (No model.)

*To all whom it may concern:*

Be it known that I, AARON W. GAYHART, a citizen of the United States, residing at Washington, in the county of Washington, and State of Pennsylvania, have invented certain new and useful Improvements in Shade-Rollers, of which the following is a specification, reference being had therein to the accompanying drawings, in which—

Figure 1:
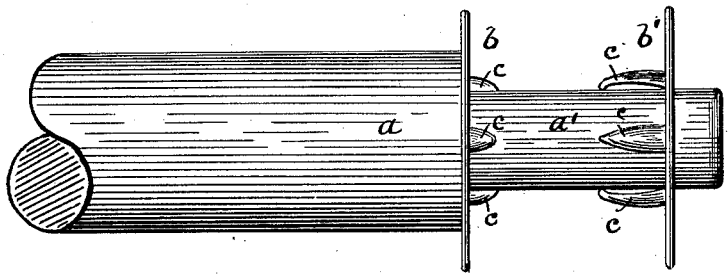
Figure 2:
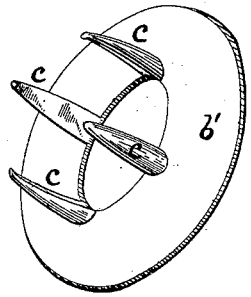

Figure 1 represents a side elevation of a portion of a shade-roller provided with my improved adjustable spool, and Fig. 2 a perspective view of one of the adjustable sides of the spool removed.

This invention relates particularly to that class of shade-rollers wherein a cord is employed to revolve the roller in winding or unwinding the shade, the operating-cord, as usual, extending down a sufficient distance to be within convenient reach. In using the ordinary roller a difficulty has been that the spool was found in many cases to be insufficient to hold the operating-cord when used in connection with long windows. It is therefore the essential object of this invention to provide a spool whose capacity may be readily varied to suit or accommodate the length of operating-cord employed in each particular case, as will more fully hereinafter appear.

In the drawings, the letter $a$ designates a portion of a shade-roller having its end $a'$ reduced in diameter. Upon this reduced portion are slipped disks or plates $b\ b'$, the plates being provided with central openings for the passage of the reduced portion of the roller. Formed integrally with the said plates $b\ b'$ and projecting from their adjacent faces are a series of fingers $c$, having their ends reduced to a point and turned slightly inwardly toward the roller. Each disk is preferably provided with four of these fingers; but it is evident that a greater or less number may be employed without departing from the invention. The fingers project, preferably, from the edges of the central openings of the disks and they extend approximately parallel with the roller. The fingers are constructed of malleable metal, so that when the disks are set at the proper distance apart they may be forced or pressed into the roller, and thereby hold the said disks or sides in their adjusted positions.

In applying the spool to the roller the inner disk $b$ is placed against the shoulder formed by the reduced portion of the roller and its outwardly-projecting fingers pressed firmly into the roller to hold it in place. The outer disk or side $b'$ is then placed upon the roller with its fingers extending inwardly toward the other disk and moved along the roller to the desired place, when its fingers are also pressed inwardly so as to clamp the roller and hold it securely in place. In the drawings the inner disk or side $b$ is shown secured in place by the clamping-fingers, and the fingers of the outer disk are shown in the position they occupy before being pressed into the roller. It will be observed that only the pointed ends of the fingers enter the wooden roller.

It will be perceived that by my invention the sides of the spool may be readily adjusted with respect to each other in order that a greater or less quantity of operating-cord may be accommodated, thereby rendering every spool adaptable to various-sized windows, as the exigencies of the case may require.

This improved spool is designed particularly for use in connection with my patent, numbered 403,344, granted on the 14th day of May, 1889, for improvements in curtain-fixtures.

Having thus fully described my invention, what I claim, and desire to secure by Letters Patent, is—

1. The combination, with a shade-roller, of a spool secured thereon and consisting of a pair of sides or disks adjustable with respect to each other and provided with means for holding them in their adjusted positions, substantially as described.

2. The combination, with a shade-roller, of a spool thereon consisting of a pair of disks, one of the said disks being movable with respect to the other and provided with means for holding it in its adjusted positions, substantially as described.

3. The combination, with a shade-roller, of a spool consisting of a pair of sides or disks placed upon the said roller and being movable with respect to each other, these disks being provided with inwardly-projecting fingers adapted to clamp the roller and hold them in their adjusted positions, substantially as described.

In testimony whereof I affix my signature in presence of two witnesses.

AARON W. GAYHART.

Witnesses:
JAMES A. WILEY,
FRED. B. WILSON.